US012609850B2

(12) United States Patent
Mukherjee et al.

(10) Patent No.: US 12,609,850 B2
(45) Date of Patent: Apr. 21, 2026

(54) TECHNIQUES FOR DYNAMIC CONNECTIVITY BETWEEN COMPUTING ENTITIES

(71) Applicant: Wells Fargo Bank, N.A., San Francisco, CA (US)

(72) Inventors: Aniruddha Mukherjee, Kolkata (IN); Rameshchandra Bhaskar Ketharaju, Hyderabad (IN); Brajraj Brajraj, Bangaluru (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 333 days.

(21) Appl. No.: 18/300,762

(22) Filed: Apr. 14, 2023

(65) Prior Publication Data

US 2024/0348477 A1     Oct. 17, 2024

(51) Int. Cl.
*H04L 12/46* (2006.01)
*H04L 9/40* (2022.01)
(52) U.S. Cl.
CPC ...... *H04L 12/4641* (2013.01); *H04L 12/4633* (2013.01); *H04L 63/0272* (2013.01)
(58) Field of Classification Search
None
See application file for complete search history.

(56) References Cited

U.S. PATENT DOCUMENTS

| | | | |
|---|---|---|---|
| 8,732,790 B2 | 5/2014 | Qu | |
| 9,130,902 B2 | 9/2015 | Kuehl | |
| 10,171,591 B2 | 1/2019 | Chandwani et al. | |
| 10,382,401 B1 * | 8/2019 | Lee ...................... | H04L 63/166 |
| 10,834,137 B2 | 11/2020 | Pitre et al. | |
| 2015/0381568 A1 * | 12/2015 | Johnson ................. | H04L 63/04 726/15 |
| 2021/0014275 A1 | 1/2021 | Martinez et al. | |

* cited by examiner

*Primary Examiner* — Christine T Duong
(74) *Attorney, Agent, or Firm* — K&L Gates LLP

(57) ABSTRACT

Various embodiments are generally directed to techniques for dynamic connectivity between computing entities. Some embodiments are particularly directed to an exchange controller that dynamically establishes and destroys dedicated connections between different computing entities in an on-demand manner that restrict unnecessary network connectivity. In several embodiments, a private network may connect the exchange controller to a first set of one or more computing entities, such as applications in a private cloud. In several such embodiments, the exchange controller may utilize virtual private networks (VPNs) to establish secure communication between the first set of one or more computing entities and a second set of one or more computing entities external to the private network, such as a server or database located in an external cloud.

20 Claims, 7 Drawing Sheets

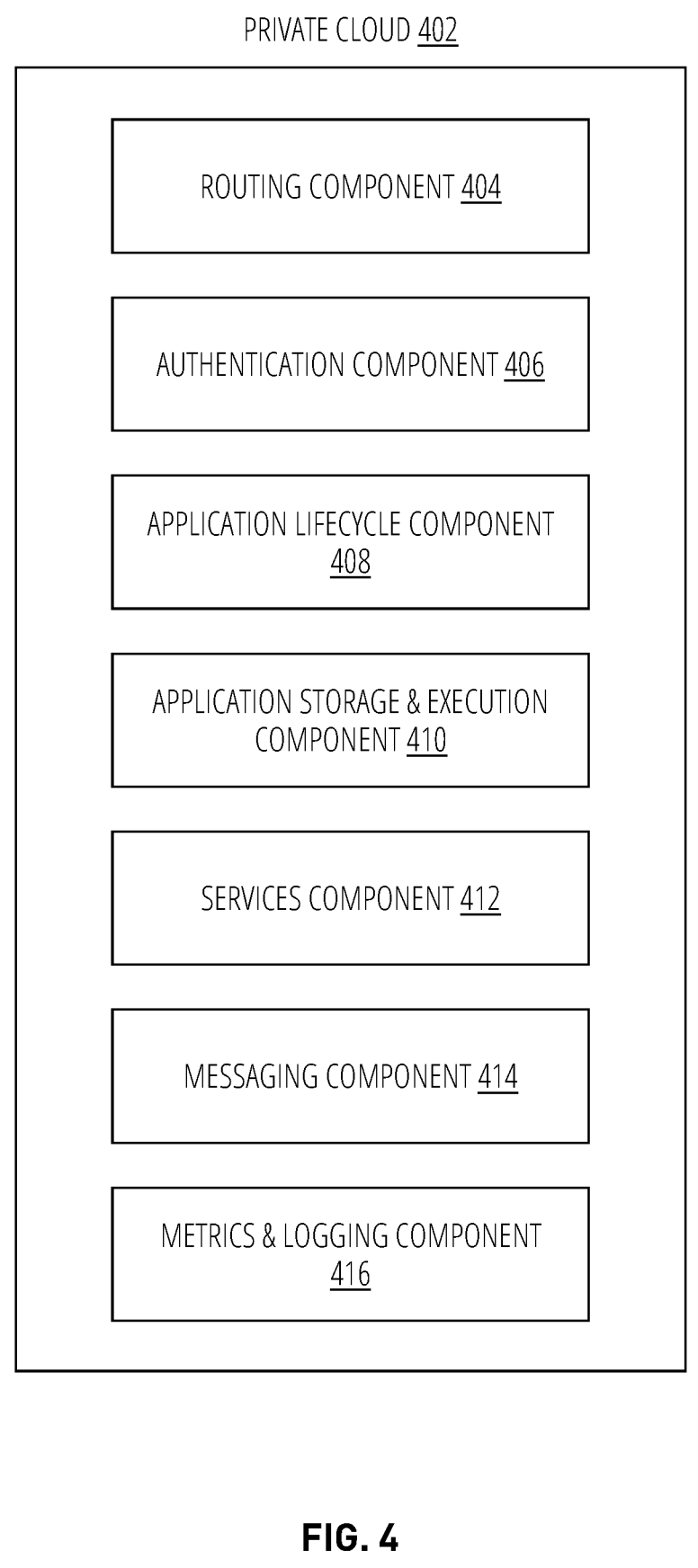

PRIVATE CLOUD <u>402</u>

ROUTING COMPONENT <u>404</u>

AUTHENTICATION COMPONENT <u>406</u>

APPLICATION LIFECYCLE COMPONENT <u>408</u>

APPLICATION STORAGE & EXECUTION COMPONENT <u>410</u>

SERVICES COMPONENT <u>412</u>

MESSAGING COMPONENT <u>414</u>

METRICS & LOGGING COMPONENT <u>416</u>

FIG. 4

500

DETERMINING A DEMAND FOR A DATA EXCHANGE BETWEEN A FIRST COMPUTING ENTITY AND A SECOND COMPUTING ENTITY, WHEREIN THE FIRST COMPUTING ENTITY IS CONNECTED TO AN EXCHANGE CONTROLLER VIA A PRIVATE NETWORK AND THE EXCHANGE CONTROLLER IS COMMUNICATIVELY COUPLABLE TO THE SECOND COMPUTING ENTITY VIA A PUBLIC NETWORK
502

ESTABLISHING, AT THE EXCHANGE CONTROLLER, A DEDICATED CONNECTION WITH THE SECOND COMPUTING ENTITY IN RESPONSE TO DETERMINING THE DEMAND FOR A DATA EXCHANGE BETWEEN A FIRST COMPUTING ENTITY AND A SECOND COMPUTING ENTITY
504

FORWARDING, VIA THE EXCHANGE CONTROLLER, A COMMUNICATION FROM THE FIRST COMPUTING ENTITY TO THE SECOND COMPUTING ENTITY VIA THE DEDICATED CONNECTION
506

DETERMINING THE DEMAND FOR THE DATA EXCHANGE BETWEEN THE FIRST AND SECOND COMPUTING ENTITIES HAS CEASED
508

DESTROYING THE DEDICATED CONNECTION BETWEEN THE EXCHANGE CONTROLLER AND THE SECOND COMPUTING ENTITY IN RESPONSE TO DETERMINING THE DEMAND FOR THE DATA EXCHANGE BETWEEN THE FIRST AND SECOND COMPUTING ENTITIES HAS CEASED
510

FIG. 5

TECHNIQUES FOR DYNAMIC CONNECTIVITY BETWEEN COMPUTING ENTITIES

FIELD OF DISCLOSURE

This disclosure relates generally to computer communication technology and more particularly to dynamically establishing and destroying dedicated connections between different computing entities.

BACKGROUND

Computers use common communication protocols over digital interconnections to communicate with each other. These interconnections are made up of telecommunication network technologies based on physically wired, optical, and wireless radio-frequency methods that may be arranged in a variety of computer network topologies. Computer networks support many applications and services, such as access to the World Wide Web, digital video and audio, shared use of application and storage servers, printers and fax machines, and use of email and instant messaging applications. A virtual private network (VPN) is a mechanism for creating a secure connection between computing entities and/or computer networks using an insecure communication medium such as the public Internet. A VPN can extend a private network (e.g., one that disallows or restricts public access), enabling users to send and receive data across public networks as if their devices were directly connected to the private network.

BRIEF SUMMARY

Processes, machines, and articles of manufacture for supporting dynamic connectivity between computing entities are described. It will be appreciated that the embodiments may be combined in any number of ways without departing from the scope of this disclosure.

Embodiments may include determining a demand for a data exchange between a first computing entity and a second computing entity, wherein the first computing entity is connected to an exchange controller via a private network and the exchange controller is communicatively couplable to the second computing entity via a public network; establishing, at the exchange controller, a dedicated connection with the second computing entity in response to determining the demand for a data exchange between a first computing entity and a second computing entity; forwarding, via the exchange controller, a communication from the first computing entity to the second computing entity via the dedicated connection; determining the demand for the data exchange between the first and second computing entities has ceased; and destroying the dedicated connection between the exchange controller and the second computing entity in response to determining the demand for the data exchange between the first and second computing entities has ceased.

Other processes, machines, and articles of manufacture are also described hereby, which may be combined in any number of ways, such as with the embodiments of the brief summary, without departing from the scope of this disclosure.

BRIEF DESCRIPTION OF THE DRAWINGS

The present disclosure is illustrated by way of example and not limitation in the figures of the accompanying drawings in which like references indicate similar elements. To easily identify the discussion of any particular element or act, the most significant digit or digits in a reference number refer to the figure number in which that element is first introduced.

FIG. 4 illustrates an exemplary aspects of a private cloud according to some embodiments.

FIG. 5 illustrates an exemplary logic flow according to some embodiments.

DETAILED DESCRIPTION

Figure 1:
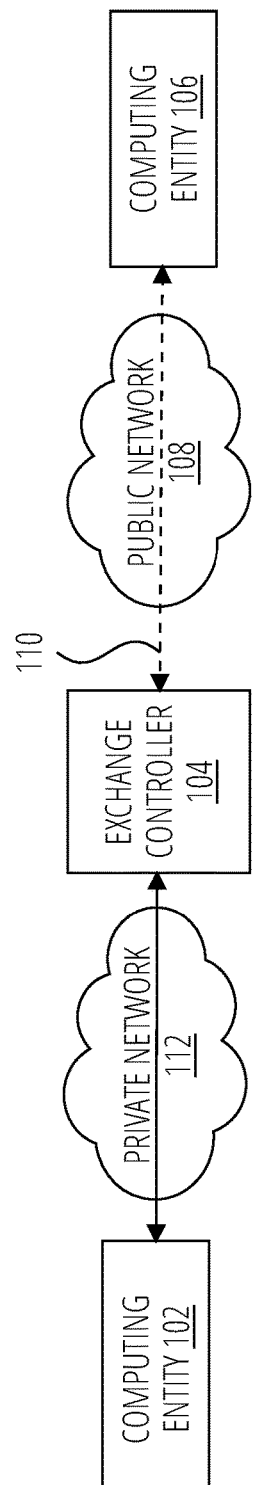
FIG. 1 illustrates an exemplary operating environment for an exchange controller according to some embodiments.

Various embodiments are generally directed to techniques for dynamic connectivity between computing entities. Some embodiments are particularly directed to an exchange controller that dynamically establishes and destroys dedicated connections between different computing entities in an on-demand manner that restrict unnecessary network connectivity. In several embodiments, a private network may connect the exchange controller to a first set of one or more computing entities, such as applications in a private cloud. In several such embodiments, the exchange controller may utilize virtual private networks (VPNs) to establish secure communication between the first set of one or more computing entities and a second set of one or more computing entities external to the private network, such as a server or database located in an external cloud. These and other embodiments are described and claimed.

Many challenges face connectivity between computing entities, such as excessive network connections. For example, existing systems utilize a plurality of static connections between different entities for communication. However, utilizing a plurality of static connections between different entities for communication results in excessive network connections that provide unnecessary attack vectors for malicious actors. Further, a plurality of static connections require additional resources to maintain. Adding further complexity, a new static connection may require expertise to establish, and, without the appropriate expertise to configure the static connection, the static connection may expose sensitive data. Such limitations can drastically reduce the security of connections and increase the resource demands of connections, contributing to inefficient systems, devices, and techniques with limited capabilities.

Various embodiments described hereby include an exchange controller that establishes and manages connections between different computing entities including determining when to create and destroy connections. In many embodiments, the exchange controller may establish connections between private and public clouds in an on-demand manner and restrict unnecessary network connectivity. The exchange controller may improve security by reducing attack vectors (e.g., dedicated connections). Additionally, or alternatively, the exchange controller may decrease resource utilization by freeing resources used to create and maintain dedicated connections. In several embodiments, the exchange controller can be a device (e.g., a field programmable gate array (FPGA)) located between computing entities (e.g., private and public clouds) that improves network connectivity between the computing entities by making it faster to fetch any near real-time data. In some embodiments, connections may be created and/or destroyed based on a combination of pre-configured rules and real-time learning mechanisms that enable the exchange controller to make decisions based on requirement. The exchange controller also provides support for various application programming interface (API) connections, such as open APIs, on-demand APIs, and third-party APIs.

In these and other ways, components/techniques described hereby may be utilized to create and destroy dedicated connections between different computing entities in a secure and efficient manner, resulting in several technical effects and advantages over conventional computer technology, including increased capabilities and reduced resource requirements. For example, real-time learning mechanisms may be utilized to enable the exchange controller to make decisions based on connectivity requirements. In various embodiments, one or more of the aspects, techniques, and/or components described hereby may be implemented in a practical application via one or more computing devices, and thereby provide additional and useful functionality to the one or more computing devices, resulting in more capable, better functioning, and improved computing devices. For example, a practical application may include improving the security of data connections, such as by establishing and destroying them based on demand. In another example, a practical application may include improving how data is exchanged, such as by making it faster to fetch data from different sources. Further, one or more of the aspects, techniques, and/or components described hereby may be utilized to improve the technical fields of data exchange, APIs, device connectivity, and/or communication between private and public clouds.

In several embodiments, components described hereby may provide specific and particular manners to enable dynamic connectivity between computing entities. In many embodiments, one or more of the components described hereby may be implemented as a set of rules that improve computer-related technology by allowing a function not previously performable by a computer that enables an improved technological result to be achieved. For example, the function allowed may include one or more of the specific and particular techniques disclosed hereby such as establishing and destroying network connections for the exchange of data in an efficient and secure manner.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter. Aspects of the disclosed embodiments may be described with reference to one or more of the following figures. Some of the figures may include a logic flow and/or a process flow. Although such figures presented herein may include a particular logic or process flow, it can be appreciated that the logic or process flow merely provides an example of how the general functionality as described herein can be implemented. Further, a given logic or process flow does not necessarily have to be executed in the order presented unless otherwise indicated. Moreover, not all acts illustrated in a logic or process flow may be required in some embodiments. In addition, a given logic or process flow may be implemented by a hardware element, a software element executed by a processor, or any combination thereof.

FIG. 1 illustrates an operating environment 100 for an exchange controller 104 according to one or more embodiments. Operating environment 100 includes a first computing entity 102 connected to the exchange controller 104 via a private network 112 and a second computing entity 106 that the exchange controller 104 may selectively connect via a public network 108 using a dedicated connection 110. More generally, the exchange controller 104 may operate to dynamically establish and destroy dedicated connections between different computing entities. In many embodiments, the dedicated connection 110 may include a VPN tunnel. It will be appreciated that one or more components of FIG. 1 may be the same or similar to one or more other components disclosed hereby. Embodiments are not limited in this context.

In various embodiments, a computing entity may refer to a hardware, software, and/or firmware component that receives input and/or generates output, such as a virtual machine running a software application. In various such embodiments, the input and/or output may be received from or sent to a second computing entity, such as a database server. For example, the first computing entity 102 may comprise an application that generates data for storage by the second computing entity 106. In many embodiments, the first computing entity 102 may be included on-premises and the second computing entity 106 may be located off-premises. For example, computing entity 102 may comprise an application operating in a private cloud located at a company facility and the computing entity 106 may comprise an application operating in a public cloud located at a data center.

In many embodiments, the exchange controller 104 may be connected to the first computing entity 102 via the private network 112. For example, the exchange controller 104 may be connected to the computing entity 102 via a wired connection to a local area network. In several embodiments, the exchange controller 104 may selectively connect to the second computing entity 106 via the public network 108 using a dedicated connection 110. In several such embodiments, the dedicated connection 110 may comprise a VPN tunnel established by the exchange controller 104 and with the computing entity 106 over at least a portion of the public network 108 (e.g., the internet). It will be appreciated that the computing entity 106 may be connected directly, or indirectly, to the public network 108.

Figure 2:
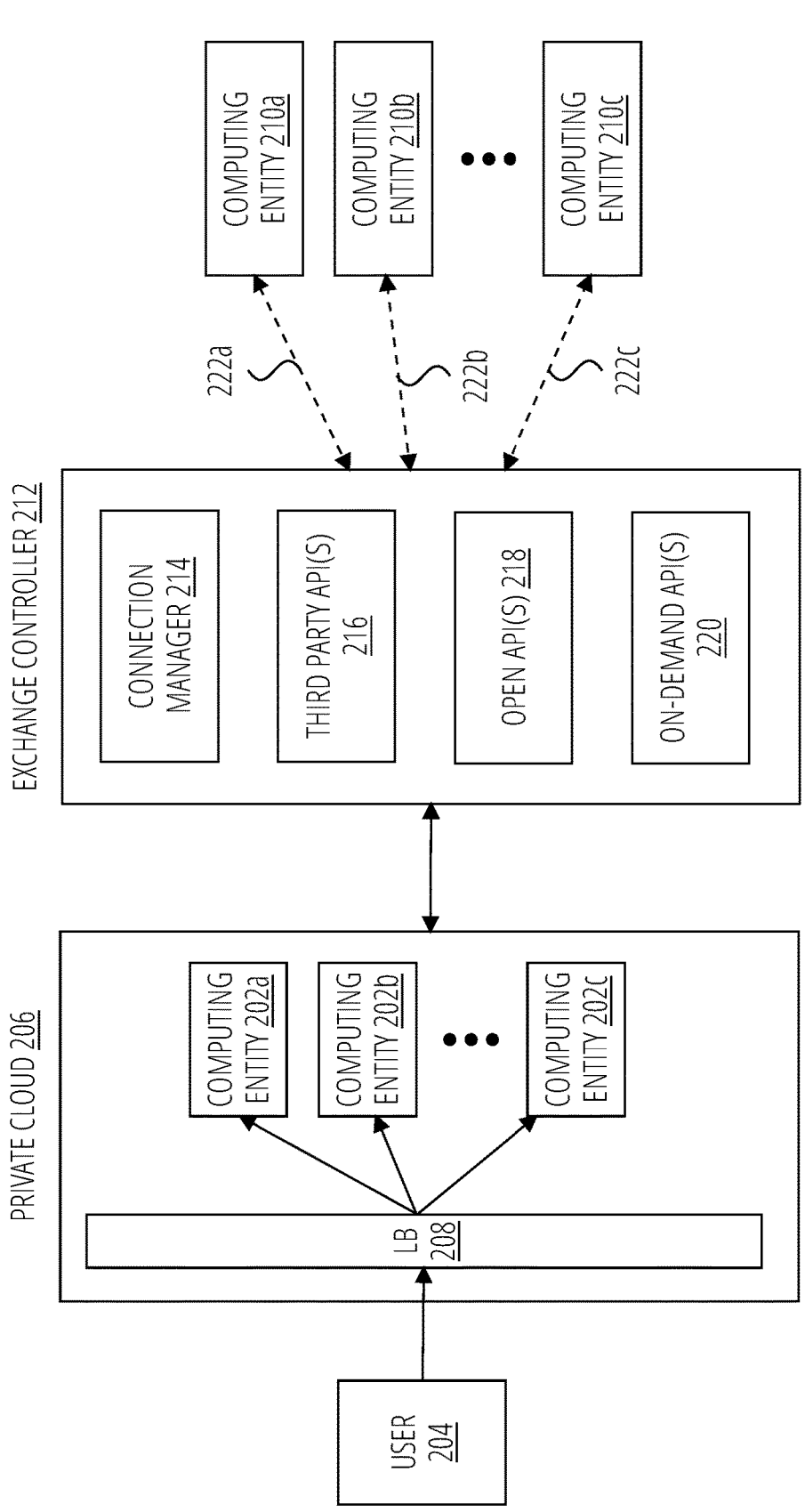
FIG. 2 illustrates exemplary aspects of an exchange controller according to some embodiments.

FIG. 2 illustrates exemplary aspects of an exchange controller 212 according to one or more embodiments. The illustrated embodiment includes a user 204, a private cloud 206 communicatively coupled with exchange controller 212, and one or more computing entities 210a, 210b, 210c (collectively referred to as "computing entities 210") that the exchange controller 212 may selectively establish/destroy dedicated connections 222a, 222b, 222c (collectively referred to as "dedicated connections 222") with, respectively. The private cloud 206 may include a load balancer (LB) 208 and one or more computing entities 202a, 202b, 202c (collectively referred to as "computing entities 202"). The exchange controller 212 may include a connection manager 214, one or more third party API(s) 216, one or more open API(s) 218, and one or more on-demand API(s)

220. It will be appreciated that one or more components of FIG. 2 may be the same or similar to one or more other components disclosed hereby. For example, exchange controller 212 may be the same or similar to exchange controller 104. In another example, computing entity 102 may be the same or similar to one or more of computing entities 202 and computing entity 106 may be the same or similar to one or more of computing entities 210. Embodiments are not limited in this context.

Generally, a user 204 may interact with the private cloud 206 to access a computing entity, such as a virtual machine comprising a data analysis software application. In some embodiments, the computing entity accessed by the user 204 may be determined by the LB 208. For example, the computing entities 202 may comprise virtual machines instantiated (or able to be instantiated) in the private cloud 206 and the LB 208 may determine an instantiated virtual machine with the data analysis software application or instantiate a new virtual machine with the data analysis software application to assign to the user. In one embodiments, the private cloud 206 may be the computing entity.

In various embodiments, the user 204 may directly or indirectly perform one or more operations on the assigned computing entity that cause the connection manager 214 of exchange controller 212 to determine a demand for a data exchange between the assigned computing entity (e.g., computing entity 202c) and a second computing entity (e.g., computing entity 210b). In additional, or alternative embodiments, the demand for the data exchange may be determined based on factors other than user input, such as a schedule or external requests (e.g., a request received from computing entity 210c). In various embodiments, the exchange controller 212 may comprise a field programmable gate array (FPGA). More generally, the connection manager 214 may be responsible for managing and establishing connections. Additionally, the connection manager 214 may determine when to create and destroy connections. In several embodiments, the connection manager 214 may include a combination of predefined rules and some real-time learning mechanisms to assist in making decisions based on requirement.

In response to determining the demand of the data exchange between computing entity 202c and computing entity 210a, the connection manager 214 of exchange controller 212 may establish the dedicated connection 222b with computing entity 210b. In many embodiments, the dedicated connection 222b may comprise a VPN tunnel established using a handshake procedure performed by the connection manager 214 with the computing entity 210b (or a component associated with the computing entity 210b). The computing entity 202c and the computing entity 210b may then communicate with one another via exchange controller 212 using the dedicated connection 222b. In some embodiments, the dedicated connection 222b may utilize encryption and/or public/private key pairs. Accordingly, in various embodiments, the exchange controller 212 may store, or have access to, one or more public and/or private keys. In various such embodiments, the one or more public and/or private keys may be utilized for establishing the dedicated connection 222b, such as by performing a handshake procedure.

In several embodiments, the connection manager 214 may destroy that dedicated connection once the demand for the data exchange between computing entity 202c and computing entity 210b has ceased. The connection manager 214 may determine the demand for the data exchange has ceased using a variety of indication. For example, connection manager 214 may destroy connections that are idle for a threshold amount of time. In another example, the connection manager 214 may destroy connections according to a schedule. In yet another example, the connection manager 214 may destroy connections after a predetermined amount of time from establishment. In yet another example, the connection manager 214 may destroy connections in response to an explicit indication, such as a message from one or both of the computing entities. In one embodiment, the connection manager 214 may start a timer when a connection is established. In one such embodiment, the connection may be destroyed when the timer expires. In various embodiments, the timer may be restarted based on activity. For example, the timer may be restarted each time traffic is detected on the connection. Accordingly, the connection will be destroyed when the connection does not have traffic for a predetermined amount of time.

In some embodiments, the connection manager 214 may identifying patterns in historical communications between different computing entities, such as using artificial intelligence and/or machine learning. In some such embodiments, the connection manager 214 may utilize these patterns to generate rules for when to establish and/or destroy connections between different computing entities. Accordingly, in several embodiments, connection manager 214 may monitor and record parameters associated with communication and/or connections between different computing entities. For example, connection manager 214 may monitor one or more of traffic, usage, duration of connection, bandwidth, endpoints, type of connection, connection security, and the like.

In many embodiments, one or more APIs may be utilized for interaction between computing entities 202 and computing entities 210. In some embodiments, the APIs may enable external computing entities (e.g., computing entities 210) to request or provide data to internal computing entities (e.g., computing entities 202). In various embodiments, the APIs may enable external computing entities to cause exchange controller 212 to establish and/or destroy connections between internal and external computing entities. For example, computing entities 210 may utilize one or more APIs supported by the exchange controller 212, such as one or more third party API(s) 216, one or more open API(s) 218, and/or one or more on-demand API(s) 220. In many embodiments, the exchange controller 212 may support one or more functionalities described hereby via these APIs.

In various embodiments, the one or more third party API(s) 216 may comprise a list, definition, and/or functionality of all third-party APIs that can be used to create a connection and exchange data. In many embodiments, the one or more open API(s) 218, also called public API(s), may include APIs made publicly available to software developers. In many such embodiments, the open API(s) may be published on the internet and shared freely, allowing the owner of a network accessible service to give a universal access to consumers. Accordingly, in one or more embodiments, the exchange controller 212 may support one or more open APIs, such as one or more open APIs defined by the operators of the private cloud 206. In one embodiment, the open API(s) 218 may enable one or more of computing entities 210 to cause the exchange controller 212 to establish a dedicated connection between one or more of computing entities 210 and computing entities 202. In various embodiments, one or more of computing entities 210 may cause the exchange controller 212 to destroy a connection.

In several embodiments, the one or more on-demand API(s) 220 may manage any API connections that are not pre-configured, such as those provided to the user 204 as an ad-hoc request or created by the user 204. In several such embodiments, the exchange controller 212 may evaluate various aspects of such an API prior to enabling a connection to be established for the new API. For example, the exchange controller 212 may evaluate the targets and functionality of the associated API calls of the on-demand API. In another example, the on-demand API may be evaluated for malicious code. In yet another example, the on-demand API may be evaluated based on accessibility of the on-demand API. In some embodiments, the new API will be created dynamically by user input, such as based on predesigned templates. In many embodiments, user 204 may design and configure one or more of the on-demand API(s) 220. For example, user 204 may create an on-demand API that enables a customer to obtain data from computing entity 202*c* via a specified IP address for a period of 4 days.

Figure 3:
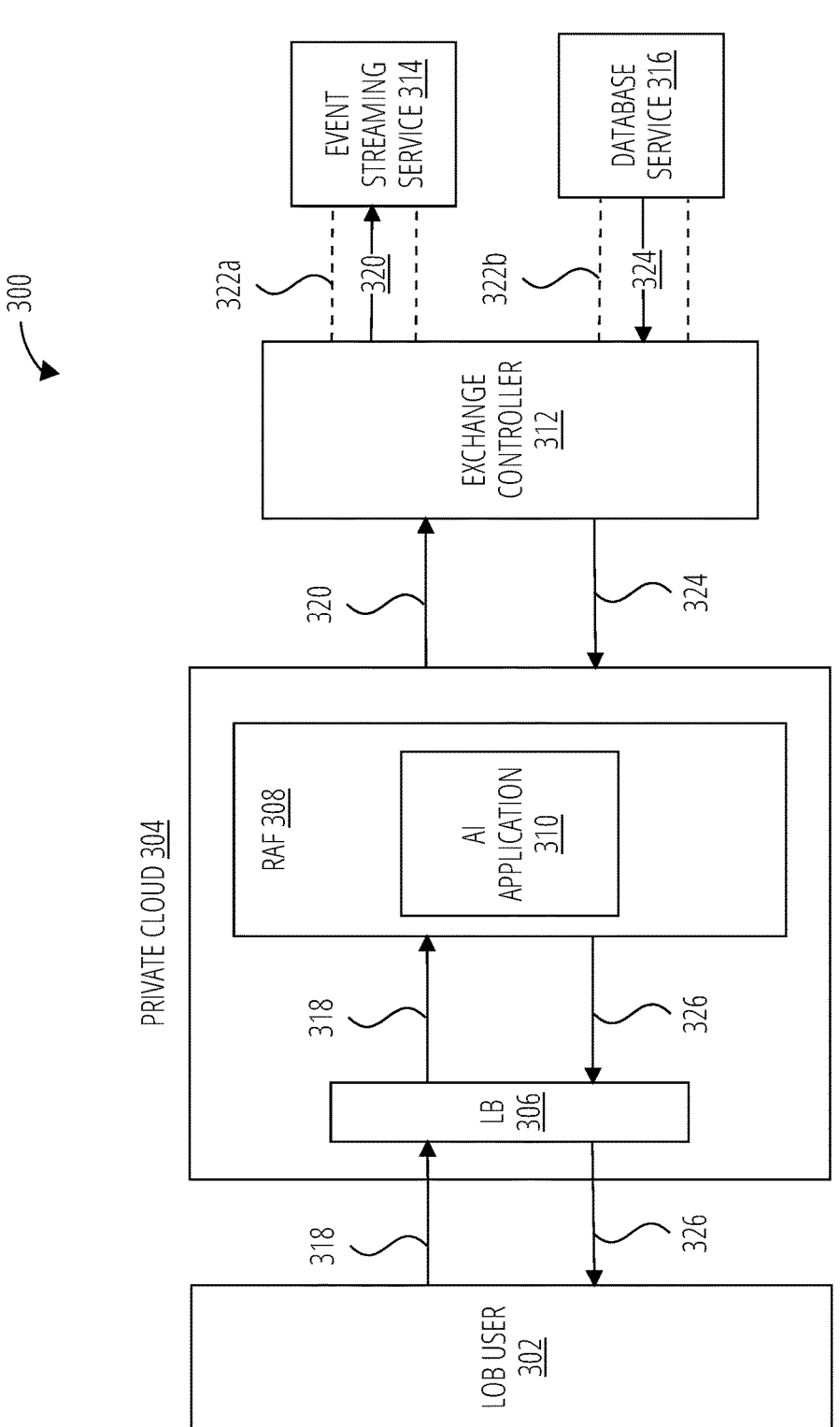
FIG. 3 illustrates an exemplary process flow according to some embodiments.

FIG. 3 illustrates an exemplary process flow 300 according to some embodiments. The illustrated embodiment includes a line of business (LOB) user 302, a private cloud 304, an exchange controller 312, an event streaming service 314, and a database service 316. The private cloud 304 includes load balancer (LB) 306 and a RESTful Automation Framework (RAF) 308 with an artificial intelligence (AI) application 310. The process flow 300 may generally correspond to the exchange controller 312 establishing dedicated connections comprising virtual private network (VPN) tunnel 322*a* between the private cloud 304 and the event streaming service 314 and VPN tunnel 322*b* between the private cloud 304 and the database service 316. In some embodiments, the event streaming service 314 and database service 316 may be located in one or more public clouds. It will be appreciated that one or more components of FIG. 3 may be the same or similar to one or more other components disclosed hereby. For example, AI application 310 may be the same or similar to computing entity 102. In another example, event streaming service 314 may be the same or similar to one or more of computing entities 202 and/or computing entity 106. In yet another example, VPN tunnel 322*a* may be the same or similar to dedicated connection 110 or one or more of dedicated connections 222. Embodiments are not limited in this context.

In various embodiments, the process flow 300 may begin with the LOB user 302 providing scoring input data 318 to the LB 306 of private cloud 304. For example, the LOB user 302 may make a REST API call along with scoring input data in its payload. The LB 306 may direct the scoring input data 318 to the AI application 310 of RAF 308. In various embodiments, the LB 306 may be utilized to balance the traffic load across multiple instances inside the private cloud 304.

More generally, the RAF 308 may assist in automating operationalization of models as a service. In some embodiments, the RAF 308 may provide an automated operationalization capability of AI and/or machine learning (ML) models in a service mode. In various embodiments, the RAF 308 may comprise a light-weight REST tool that pipelines code (modules) and models provided by users (e.g., user 204 or LOB user 302) with parameters required to run as a web service. In many embodiments, the RAF 308 enables users to implement their code into the framework and provide all capabilities needed for operationalizing their code quickly and in a standardized way across all lines of business. In some embodiments, the RAF 308 enables zero-touch deployment of models to operationalize a model as a service and pipeline produced by users. In several embodiments, the RAF 308 is utilized to wrap a model before deployment on the private cloud 304.

Referring back to process flow 300, once the scoring input data 318 is received by the AI application 310, the AI application 310 may perform scoring based on the input data and push the scored result to the event streaming service 314. In various embodiments, in order to score the input data, the AI application 310 may require model data 324 from database service 316. For example, model data 324 may include model configuration and/or artifacts. Accordingly, exchange controller 312 may establish VPN tunnel 322*b* and receive and/or acquire the model data 324 via the VPN tunnel 322*b*. In some embodiments, the model data 324 may be received by exchange controller 312 from database service 316 in response to a request (e.g., API call) sent to the database service 316 via the VPN tunnel 322*b*.

In some embodiments, pushing the scored result to the event streaming service 314 may include pushing the scored result (i.e., scoring output data 320) to an event streaming service topic. Accordingly, the exchange controller 312 may establish VPN tunnel 322*a* with the event streaming service 314 and then utilize the VPN tunnel 322*a* to transmit the scoring output data 320 to the event streaming service 314. In some embodiments, the exchange controller 312 may incorporate the scoring output data 320 into an API call sent to the event streaming service 314. The event streaming service 314 may enable multiple subscribers to consume/receive the scored output data based on requirement and design.

Regarding establishment of the VPN tunnels 322*a*, 322*b*, in some embodiments, the VPN tunnel 322*a* and/or VPN tunnel 322*b* may be established in response to a variety of triggers. For example, in response to receiving scoring input data 318, the AI application 310 may cause the exchange controller 312 to establish VPN tunnel 322*b* and acquire model data 324. In a further example, the exchange controller 312 receiving the scoring output data 320 may trigger establishment of VPN tunnel 322*a*. In other embodiments, the VPN tunnel 322*a* and/or VPN tunnel 322*b* may be established in response to LOB user 302 communicating the scoring input data 318 to the private cloud 304. In one embodiment, the exchange controller 312 may initially establish VPN tunnel 322*b* is response to a request from the AI application 310. However, using pattern recognition and/or learning mechanisms, the exchange controller 312 may learn to establish the VPN tunnel 322*b* in response to the LOB user 302 communicating the scoring input data 318 to the private cloud 304. Similarly, the exchange controller 312 may learn to establish the VPN tunnel 322*a* in response to the AI application 310 receiving the scoring input data 318.

Regarding destruction of the VPN tunnels 322*a*, 322*b*, in some embodiments, the VPN tunnel 322*a* and/or VPN tunnel 322*b* may be destroyed in response to a variety of triggers. For example, the VPN tunnel 322*a* may be destroyed after receiving a confirmation that the scoring output data 320 was received by the event streaming service 314. In another example, the VPN tunnel 322*b* may be destroyed in response to receiving the model data 324. In one embodiment, the exchange controller 312 may destroy VPN tunnel 322*b* after a predetermined amount of time has lapsed since establishment of the VPN tunnel 322*b* or a predetermined amount of time has lapsed since traffic on the VPN tunnel 322*b*. However, using pattern recognition and/or learning mechanisms, the exchange controller 312 may learn to destroy VPN tunnel 322*b* immediately after model data 324 is received. In these and other ways, exchange controller 312 may limit network connectivity in improved ways that reduce resource requirements and improve security, such as by reducing attack vectors.

FIG. 4 illustrates exemplary aspects of a private clouds 402 according to some embodiments. In the illustrated embodiment, the private cloud 402 may include a routing component 404, an authentication component 406, application lifecycle component 408, application storage & execution component 410, services component 412, messaging component 414, metrics & logging component 416. In various embodiments, an exchange controller may interact with one or more components of the private cloud 402 to facilitate establishing and/or destroying connections as well as communicating with various computing entities. For example, analyze historical data collected by one or more components of the private cloud 402 (e.g., application storage & execution component 410 and/or metrics & logging component 416) to generate rules for when to establish and/or destroy connections. It will be appreciated that one or more components of FIG. 4 may be the same or similar to one or more other components disclosed hereby. For example, private cloud 402 may be the same or similar to private cloud 206 and/or private cloud 304. Embodiments are not limited in this context.

In some embodiments, the routing component 404 may be responsible for establishing unique routes for each application. In some such embodiments, the routing component 404 may map incoming requests to the proper application. In many embodiments, the authentication component 406 may provide one or more of identity, security, and authorization services. In some embodiments, the authentication component 406 may be responsible for user authorization and authentication (UAA).

In various embodiments, the application lifecycle component 408 may include a cloud controller that provides a restful interface to domain objects. Application lifecycle component 408 may also include a chain of components that work together to keep applications running. The first end of the chain may include the user and the other end of the chain may include the instances of applications running on virtual machines, which may crash or become unavailable.

In several embodiments, the application storage & execution component 410 may include storage for droplets and binary large files. In several such embodiments, the application storage & execution component 410 may eliminate the need to reupload/restage when scaling an application. In various embodiments, the application storage & execution component 410 may facilitate collection and/or storage of application metadata (e.g., application name, number of instances, memory limits, application routes, and bound services). In many embodiments, the application storage & execution component 410 may interact with the exchange controller for sending and/or receiving data. For example, the exchange controller may establish a VPN tunnel with a database for storing application metadata generated by the application storage & execution component 410. In another example, the exchange controller may generate one or more rules for establishing and/or destroying connections based on application metadata. In such other examples, the exchange controller may establish a dedicated connection in response to the number of instances of an application increasing. Additionally, the application storage & execution component 410 may include a self-healing container system that attempts to keep the correct number of instances running to avoid network failures and crashes.

In some embodiments, the services component 412 may provide an interface for native and external third-party services, such as a mail server or messaging service. Accordingly, in various embodiments, the exchange controller may operate in conjunction with the services component 412 to facilitate connectivity between the services component 412 and external third-party services.

In many embodiments, the messaging component 414 may keep control data that lives longer, like component IP addresses and distributed locks, to prevent components from duplicating actions. In one or more embodiments, the exchange controller may utilize one or more portions of the control data. For example, the exchange controller may acquire IP addresses from the messaging component 414, such as for use in establishing connections or routing communications. In some embodiments, messaging component 414 may provide central coordination for activities/actions in the private cloud 402.

In various embodiments, the metrics & logging component 416 may provide a master logging process. In various such embodiments, the master logging process may accept logs from application instances and private cloud components. In many embodiments, the metrics & logging component 416 may accumulate logs from multiple sources and aggregate by application. In several embodiments, the exchange controller may interact with the metrics & logging component 416. For example, the exchange controller may generate one or more rules for establishing and/or destroying connections based on the logs and/or metrics generated by metrics & logging component 416.

FIG. 5 illustrates a logic flow 500 of an exemplary technique for on-demand connectivity according to some embodiments. Aspects of logic flow 500 may relate to various embodiments described hereby. In various embodiments, logic flow 500 may be performed by an exchange controller. Logic flow 500 may begin at block 502. Block 502 may include determining a demand for a data exchange between a first computing entity and a second computing entity. Further, the first computing entity may be connected to an exchange controller via a private network and the exchange controller may be communicatively couplable to the second computing entity via a public network. For example, exchange controller 104 may determine a demand for a data exchange between computing entity 102 and computing entity 106. Further, the computing entity 102 may be connected to the exchange controller 104 via private network 112 and computing entity 106 may be communicatively couplable to the exchange controller 104 by the exchange controller 104 establishing a dedicated connection 110 over at least a portion of the public network 108.

Continuing to block 504, a dedicated connection with the second computing entity may be established in response to determining the demand for a data exchange between a first computing entity and a second computing entity. For example, exchange controller 104 may establish dedicated connection 110 in response to determining the demand for a data exchange between computing entity 102 and computing entity 106. At block 506, a communication may be forwarded, via the exchange controller, from the first computing entity to the second computing entity via the dedicated connection. For example, exchange controller 312 may forward scoring output data 320 from AI application 310 to event streaming service 314 via VPN tunnel 322a.

Proceeding to block 508, a determination that the demand for the data exchange between the first and second computing entities has ceased may be made. For example, exchange controller 312 may determine the demand for a data exchange between AI application 310 and database service 316 has ceased. For example, exchange controller 312 may determine the demand for a data exchange between AI application 310 and database service 316 has ceased based on inactivity on VPN tunnel 322b and/or a timer. In another example, exchange controller 312 may determine the demand for a data exchange between AI application 310 and database service 316 has ceased based on receipt of model data 324. At block 510, the dedicated connection between the exchange controller and the second computing entity may be destroyed in response to determining the demand for the data exchange between the first and second computing entities has ceased. For example, exchange controller 312 may destroy VPN tunnel 322b in response to determining the demand for a data exchange between AI application 310 and database service 316 has ceased.

Figure 6:
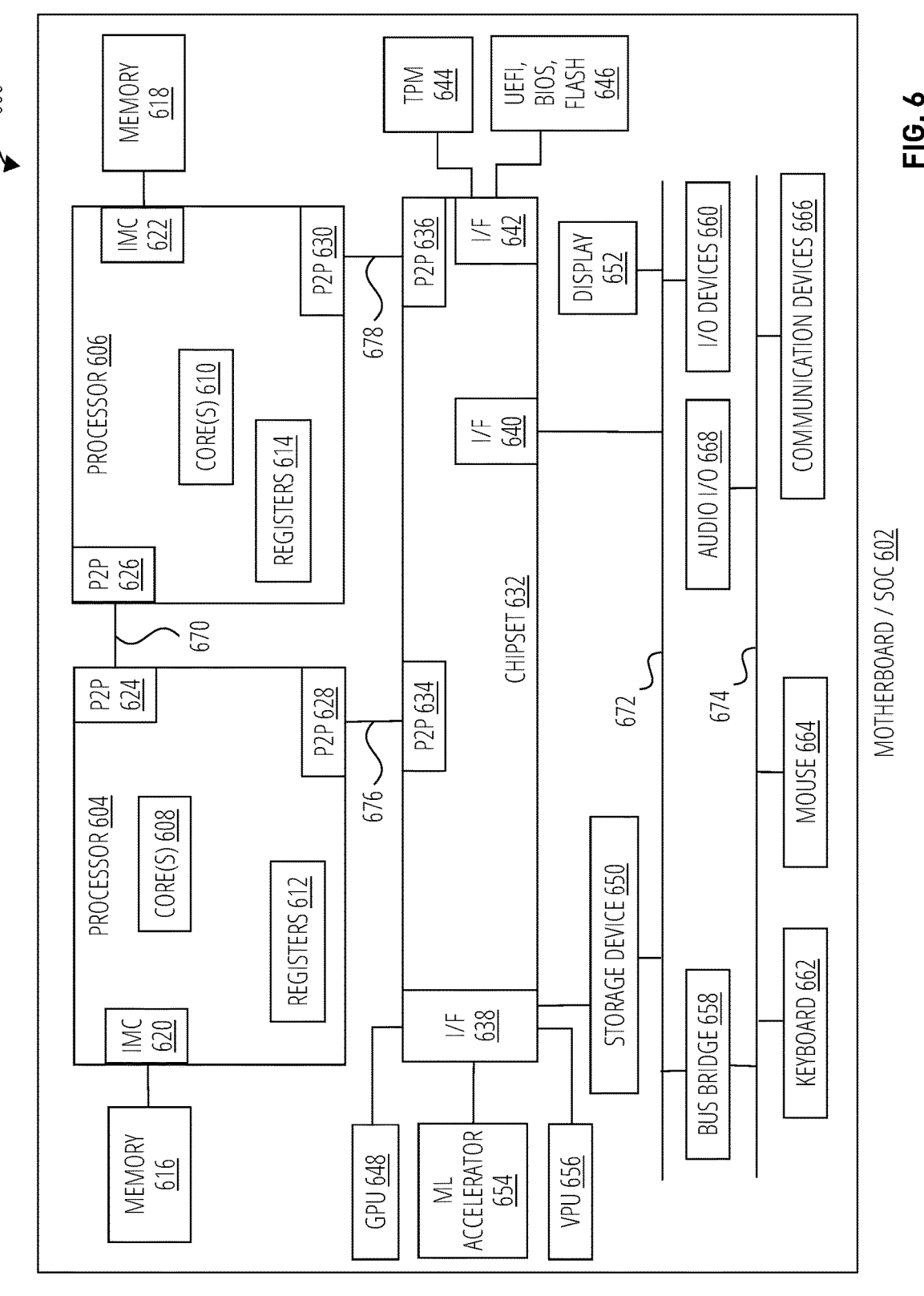
FIG. 6 illustrates exemplary aspects of a computing system according to one or more embodiments described hereby.

FIG. 6 illustrates an embodiment of a system 600 that may be suitable for implementing various embodiments described hereby. System 600 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 600 may have a single processor with one core or more than one processor. Note that the term "processor" refers to a processor with a single core or a processor package with multiple processor cores. In at least one embodiment, the computing system 600, or one or more components thereof, is representative of one or more components described hereby, such as computing entity 102, computing entity 106, exchange controller 212, and/or private cloud 402. More generally, the computing system 600 may be configured to implement embodiments including logic, systems, logic flows, methods, apparatuses, and functionality described hereby. The embodiments, however, are not limited to implementation by the system 600.

As used in this application, the terms "system" and "component" and "module" are generally intended to refer to a computer-related entity, either hardware, a combination of hardware and software, software, or software in execution, examples of which are provided by the exemplary system 600. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Although not necessarily illustrated, the computing system 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. Further, the computing system 600 may include or implement various articles of manufacture. An article of manufacture may include a non-transitory computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, encrypted code, and the like, implemented using any suitable high-level, low-level, object-oriented, visual, compiled, and/or interpreted programming language. Embodiments may also be at least partly implemented as instructions contained in or on a non-transitory computer-readable medium, which may be read and executed by one or more processors to enable performance of the operations described herein.

As illustrated in FIG. 6, the system 600 comprises a motherboard or system-on-chip (SoC) 602 for mounting platform components. Motherboard or system-on-chip (SoC) 602 is a point-to-point (P2P) interconnect platform that includes a first processor 604 and a second processor 606 coupled via a point-to-point interconnect 670 such as an Ultra Path Interconnect (UPI). In other embodiments, the system 600 may be of another bus architecture, such as a multi-drop bus. Furthermore, each of processor 604 and processor 606 may be processor packages with multiple processor cores including core(s) 608 and core(s) 610, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 604 and chipset 632. Some platforms may include additional components and some platforms may only include sockets to mount the processors and/or the chipset. Furthermore, some platforms may not have sockets (e.g., SoC, or the like).

The processor 604 and processor 606 can be any of various commercially available processors. Dual microprocessors, multi-core processors, and other multi-processor architectures may also be employed as the processor 604 and/or processor 606. Additionally, the processor 604 need not be identical to processor 606.

Processor 604 includes an integrated memory controller (IMC) 620 and point-to-point (P2P) interface 624 and P2P interface 628. Similarly, the processor 606 includes an IMC 622 as well as P2P interface 626 and P2P interface 630. IMC 620 and IMC 622 couple the processors processor 604 and processor 606, respectively, to respective memories (e.g., memory 616 and memory 618). Memories 616, 618 can store instructions executable by circuitry of system 600

(e.g., processor 604, processor 606, graphics processing unit (GPU) 648, ML accelerator 654, vision processing unit (VPU) 656, or the like). For example, memories 616, 618 can store instructions for one or more of connection manager 214, third party API(s) 216, open API(s) 218, on-demand API(s) 220, AI application 310, private cloud 402, or the like. In another example, memories 616, 618 can store data, such as historical parameters associated with communication and/or connections between different computing entities, public keys, private keys, API definitions, and the like. Memory 616 and memory 618 may be portions of the main memory (e.g., a dynamic random-access memory (DRAM)) for the platform such as double data rate type 3 (DDR3) or type 4 (DDR4) synchronous DRAM (SDRAM). In the present embodiment, the memory 616 and memory 618 locally attach to the respective processors (i.e., processor 604 and processor 606). In other embodiments, the main memory may couple with the processors via a bus and/or shared memory hub.

System 600 includes chipset 632 coupled to processor 604 and processor 606. Furthermore, chipset 632 can be coupled to storage device 650, for example, via an interface (I/F) 638. The I/F 638 may be, for example, a Peripheral Component Interconnect-enhanced (PCI-e). In many embodiments, storage device 650 comprises a non-transitory computer-readable medium. Storage device 650 can store instructions executable by circuitry of system 600 (e.g., processor 604, processor 606, GPU 648, ML accelerator 654, vision processing unit 656, or the like). For example, storage device 650 can store instructions for one or more of exchange controller 104, exchange controller 212, connection manager 214, third party API(s) 216, open API(s) 218, on-demand API(s) 220, or the like. In another example, storage device 650 can store data, such as historical parameters associated with communication and/or connections between different computing entities, public keys, private keys, API definitions, and the like. In some embodiments, instructions may be copied or moved from storage device 650 to memory 616 and/or memory 618 for execution, such as by processor 604 and/or processor 606.

Processor 604 couples to a chipset 632 via P2P interface 628 and P2P interface 634 while processor 606 couples to a chipset 632 via P2P interface 630 and P2P interface 636. Direct media interface (DMI) 676 and DMI 678 may couple the P2P interface 628 and the P2P interface 634 and the P2P interface 630 and P2P interface 636, respectively. DMI 676 and DMI 678 may be a high-speed interconnect that facilitates, e.g., eight Giga Transfers per second (GT/s) such as DMI 3.0. In other embodiments, the components may interconnect via a bus.

The chipset 632 may comprise a controller hub such as a platform controller hub (PCH). The chipset 632 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 632 may comprise more than one controller hub such as a chipset with a memory controller hub, a graphics controller hub, and an input/output (I/O) controller hub.

In the depicted example, chipset 632 couples with a trusted platform module (TPM) 644 and UEFI, BIOS, FLASH circuitry 646 via I/F 642. The TPM 644 is a dedicated microcontroller designed to secure hardware by integrating cryptographic keys into devices. The UEFI, BIOS, FLASH circuitry 646 may provide pre-boot code.

Furthermore, chipset 632 includes the I/F 638 to couple chipset 632 with a high-performance graphics engine, such as, graphics processing circuitry or a graphics processing unit (GPU) 648. In other embodiments, the system 600 may include a flexible display interface (FDI) (not shown) between the processor 604 and/or the processor 606 and the chipset 632. The FDI interconnects a graphics processor core in one or more of processor 604 and/or processor 606 with the chipset 632.

Additionally, ML accelerator 654 and/or vision processing unit 656 can be coupled to chipset 632 via I/F 638. ML accelerator 654 can be circuitry arranged to execute ML related operations (e.g., training, inference, etc.) for ML models. Likewise, vision processing unit 656 can be circuitry arranged to execute vision processing specific or related operations. In particular, ML accelerator 654 and/or vision processing unit 656 can be arranged to execute mathematical operations and/or operands useful for machine learning, neural network processing, artificial intelligence, vision processing, etc.

Various I/O devices 660 and display 652 couple to the bus 672, along with a bus bridge 658 which couples the bus 672 to a second bus 674 and an I/F 640 that connects the bus 672 with the chipset 632. In one embodiment, the second bus 674 may be a low pin count (LPC) bus. Various I/O devices may couple to the second bus 674 including, for example, a keyboard 662, a mouse 664, and communication devices 666.

Furthermore, an audio I/O 668 may couple to second bus 674. Many of the I/O devices 660 and communication devices 666 may reside on the motherboard or system-on-chip (SoC) 602 while the keyboard 662 and the mouse 664 may be add-on peripherals. In other embodiments, some or all the I/O devices 660 and communication devices 666 are add-on peripherals and do not reside on the motherboard or system-on-chip (SoC) 602. More generally, the I/O devices of system 600 may include one or more of microphones, speakers, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, displays, augmented/virtual reality devices, printers, actuators, motors, transducers, and the like.

Figure 7:
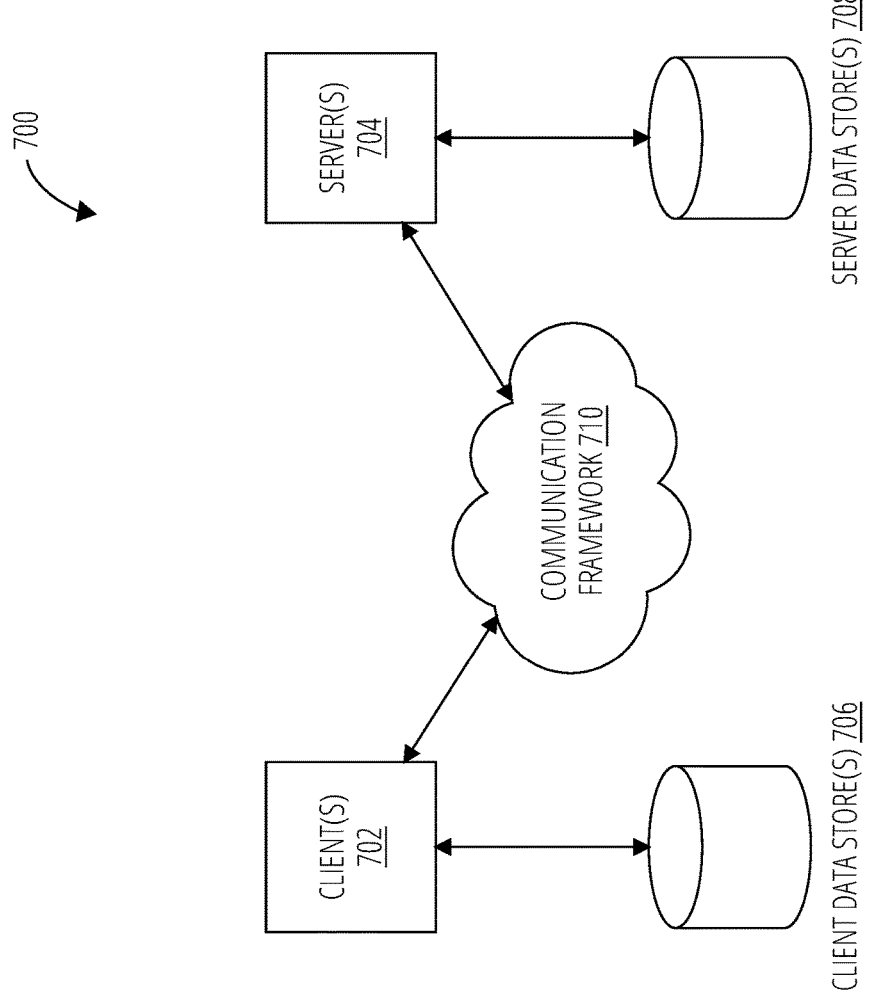
FIG. 7 illustrates exemplary aspects of a communications architecture according to one or more embodiments described hereby.

FIG. 7 is a block diagram depicting an exemplary communications architecture 700 suitable for implementing various embodiments as previously described, such as communications between exchange controller 212 and one or more of computing entities 210. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 includes one or more client(s) 702 and server(s) 704. In some embodiments, each client 702 and/or server 704 may include a computing system (e.g., system 600) The server(s) 704 may implement one or more devices of computing entity 106, computing entities 210, event streaming service 314, and database service 316. The client(s) 702 and the server(s) 704 are operatively connected to one or more respective client data store(s) 706 and server data store(s) 708 that can be employed to store information local to the respective client(s) 702 and server(s) 704, such as cookies and/or associated contextual information. In various embodiments, any one of server(s) 704 may implement one or more logic flows or operations described hereby, such as in conjunction with storage of data received from any one of client(s) 702 on any of server data store(s) 708. In one or more embodiments, one or more of client data store(s) 706 or server data store(s) 708 may include memory accessible to one or more portions of components, applications, and/or techniques described hereby.

The client(s) 702 and the server(s) 704 may communicate information between each other using a communication framework 710. The communication framework 710 may implement any well-known communications techniques and protocols. The communication framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by client(s) 702 and the server(s) 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate.

The various devices, components, modules, features, and functionalities described hereby may include, or be implemented via, various hardware elements, software elements, or a combination of both. Examples of hardware elements may include devices, logic devices, hardware components, processors, microprocessors, circuits, circuitry, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, algorithms, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds, and other design or performance constraints, as desired for a given implementation. It is noted that hardware, firmware, and/or software elements may be collectively or individually referred to herein as "logic", "circuit", or "circuitry".

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

There are a number of example embodiments described herein.

Example 1 is a computer-implemented method, comprising: determining a demand for a data exchange between a first computing entity and a second computing entity, wherein the first computing entity is connected to an exchange controller via a private network and the exchange controller is communicatively couplable to the second computing entity via a public network; establishing, at the exchange controller, a dedicated connection with the second computing entity in response to determining the demand for a data exchange between a first computing entity and a second computing entity; forwarding, via the exchange controller, a communication from the first computing entity to the second computing entity via the dedicated connection; determining that the demand for the data exchange between the first and second computing entities has ceased; and destroying the dedicated connection between the exchange controller and the second computing entity in response to determining the demand for the data exchange between the first and second computing entities has ceased.

Example 2 is the computer-implemented method of Example 1 that may optionally include that the dedicated connection comprises a virtual private network tunnel established over at least a portion of the public network.

Example 3 is the computer-implemented method of Example 1 that may optionally include that the first computing entity comprises an application located in a private cloud.

Example 4 is the computer-implemented method of Example 1 that may optionally include that the second computing entity comprises a database or a server located in a public cloud.

Example 5 is the computer-implemented method of Example 1 that may optionally include performing, via the exchange controller, a handshake with the second computing entity to establish the dedicated connection.

Example 6 is the computer-implemented method of Example 1 that may optionally include receiving, at the exchange controller, a communication from the second computing entity via the dedicated connection; forwarding, via the exchange controller, the communication received from the second computing entity to the first computing entity; and forwarding, via the exchange controller, a communication received from the second computing entity via the dedicated connection to the first computing entity.

Example 7 is the computer-implemented method of Example 1 that may optionally include implementing, at the exchange controller, an application programming interface (API) for the first computing entity, wherein the second computing entity interacts with the first computing entity via the API.

Example 8 is the computer-implemented method of Example 7 that may optionally include receiving an ad hoc request from a user that defines at least a portion of the API.

Example 9 is the computer-implemented method of Example 8 that may optionally include verifying that the portion of the API defined in the ad hoc request is compliant with a set of rules associated with the exchange controller.

Example 10 is the computer-implemented method of Example 7 that may optionally include receiving a communication from the first or second computing entity that defines at least a portion of the API.

Example 11 is the computer-implemented method of Example 10 that may optionally include verifying that the portion of the API defined in the communication from the first or second computing entity is compliant with a set of rules associated with the exchange controller.

Example 12 is the computer-implemented method of Example 1 that may optionally include that determination of the demand for the data exchange between the first and second computing entities is based on a communication received by the exchange controller from the first or second computing entity.

Example 13 is the computer-implemented method of Example 1 that may optionally include that determination of the demand for the data exchange between the first and second computing entities has ceased is based on a communication received by the exchange controller from the first or second computing entity.

Example 14 is the computer-implemented method of Example 1 that may optionally include that determination of the demand for the data exchange between the first and second computing entities is based on a schedule.

Example 15 is an apparatus comprising a processor and a memory storing instructions that, when executed by the processor, cause the processor to perform the computer-implemented method of any of Examples 1 to 14.

Example 16 is a non-transitory machine-readable medium storing computer-executable program code instructions that, when executed by a computing apparatus, cause the computing apparatus to perform the computer-implemented method of any of Examples 1 to 14.

What has been described above includes examples of the disclosed architecture. It is, of course, not possible to describe every conceivable combination of components and/ or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
    determining, at an exchange controller comprising a field programmable gate array, a demand for a data exchange between a private cloud entity and a public cloud entity, wherein the private cloud entity is communicatively coupled to the exchange controller via a private network, wherein the public cloud entity is communicatively coupled to the exchange controller via a public network;
    establishing, at the exchange controller using the field programmable gate array, a dedicated connection with the public cloud entity in response to determining the demand for the data exchange between the private cloud entity and the public cloud entity;
    forwarding, via the exchange controller, a communication from the private cloud entity to the public cloud entity via the dedicated connection;
    determining, based on a historical communication, a pattern associated with the communication or the public cloud entity, wherein the pattern indicates that the dedicated connection provides an unnecessary attack vector for a malicious actor; and
    destroying, based on the pattern, the dedicated connection between the exchange controller and the public cloud entity.

2. The computer-implemented method of claim 1, wherein the dedicated connection comprises a virtual private network tunnel established over at least a portion of the public network.

3. The computer-implemented method of claim 1, wherein the private cloud entity comprises an application located in a private cloud.

4. The computer-implemented method of claim 1, wherein the public cloud entity comprises a database or a server located in a public cloud.

5. The computer-implemented method of claim 1, further comprising performing, via the exchange controller, a handshake with the public cloud entity to establish the dedicated connection.

6. The computer-implemented method of claim 1, further comprising:
    receiving, at the exchange controller, the communication from the public cloud entity via the dedicated connection.

7. The computer-implemented method of claim 1, further comprising implementing, at the exchange controller, an application programming interface (API) for the private cloud entity, wherein the public cloud entity interacts with the private cloud entity via the API.

8. The computer-implemented method of claim 7, further comprising receiving an ad hoc request from a user that defines at least a portion of the API.

9. The computer-implemented method of claim 8, further comprising verifying that the portion of the API defined in the ad hoc request is compliant with a set of rules associated with the exchange controller.

10. The computer-implemented method of claim 7, further comprising receiving the communication from the private cloud entity or the public cloud entity that defines at least a portion of the API.

11. The computer-implemented method of claim 10, further comprising verifying that the portion of the API defined in the communication from the private cloud entity or the public cloud entity is compliant with a set of rules associated with the exchange controller.

12. The computer-implemented method of claim 1, wherein determination of the demand for the data exchange between the private cloud entity and the public cloud entity is based on the communication received by the exchange controller from the private cloud entity or the public cloud entity.

13. The computer-implemented method of claim 1, wherein determination of the demand for the data exchange between the private cloud entity and the public cloud entity has ceased is based on the communication received by the exchange controller from the private cloud entity or the public cloud entity.

14. The computer-implemented method of claim 1, wherein determination of the demand for the data exchange between the private cloud entity or the public cloud entity is based on a schedule.

15. An apparatus comprising:

a processor; and memory for storing instructions that, when executed by the processor, cause the processor to:

determine, at an exchange controller comprising a field programmable gate array, a demand for a data exchange between a private cloud entity and a public cloud entity, wherein the private cloud entity is communicatively coupled to the exchange controller via a private network, wherein the public cloud entity is communicatively coupled to the exchange controller via a public network;

establish, at the exchange controller using the field programmable gate array, a dedicated connection with the public cloud entity in response to determining the demand for the data exchange between the private cloud entity and the public cloud entity;

forward, via the exchange controller, a communication from the private cloud entity to the public cloud entity via the dedicated connection;

determine, based on a historical communication, a pattern associated with the communication or the public cloud entity, wherein the pattern indicates that the dedicated connection provides an unnecessary attack vector for a malicious actor; and destroy, based on the pattern, the dedicated connection between the exchange controller and the public cloud entity.

16. The apparatus of claim 15, wherein the dedicated connection comprises a virtual private network tunnel established over at least a portion of the public network.

17. The apparatus of claim 15, wherein the private cloud entity comprises an application located in a private cloud.

18. The apparatus of claim 15, wherein the memory further stores instructions that, when executed by the processor, cause the processor to:

receive, at the exchange controller, the communication from the public cloud entity via the dedicated connection.

19. At least one non-transitory computer-readable storage medium storing computer-executable program code instructions that, when executed by a computing apparatus, cause the computing apparatus to:

determine, at an exchange controller comprising a field programmable gate array, a demand for a data exchange between a private cloud entity and a public cloud entity, wherein the private cloud entity is communicatively coupled to the exchange controller via a private network, wherein the public cloud entity is communicatively coupled to the exchange controller via a public network;

establish, at the exchange controller using the field programmable gate array, a dedicated connection with the public cloud entity in response to determining the demand for the data exchange between the private cloud entity and the public cloud entity;

forward, via the exchange controller, a communication from the private cloud entity to the public cloud entity via the dedicated connection;

determine, based on a historical communication, a pattern associated with the communication or the public cloud entity, wherein the pattern indicates that the dedicated connection provides an unnecessary attack vector for a malicious actor; and destroy, based on the pattern, the dedicated connection between the exchange controller and the public cloud entity.

20. The at least one non-transitory computer-readable storage medium of claim 19, wherein the computer-executable program code instructions, when executed by the computing apparatus, further cause the computing apparatus to perform, via the exchange controller, a handshake with the public cloud entity to establish the dedicated connection.

* * * * *